United States Patent [19]
Rugraff

[11] Patent Number: 5,855,264
[45] Date of Patent: Jan. 5, 1999

[54] VEHICLE TRANSMISSION SYSTEM FITTED WITH AN ELECTRICAL RETARDER

[75] Inventor: Guy Rugraff, Pantin, France

[73] Assignee: Labavia SGE, Montigny-Le-Bretonneux, France

[21] Appl. No.: 800,207

[22] Filed: Feb. 12, 1997

[30] Foreign Application Priority Data

Feb. 12, 1996 [FR] France .................. 96 01690

[51] Int. Cl.$^6$ .................. H02K 49/04
[52] U.S. Cl. .................. 192/4 B; 310/93; 310/105; 188/267; 188/264 R; 192/113.23
[58] Field of Search .................. 192/4 B, 113.23, 192/113.26, 113.22, 113.21; 188/267, 264 R, 158, 159, 164; 310/105, 93, 268

[56] References Cited

U.S. PATENT DOCUMENTS

| | | | |
|---|---|---|---|
| 3,871,466 | 3/1975 | Bessiere | 188/267 X |
| 3,908,141 | 9/1975 | Lemonnier | 310/105 X |
| 4,488,074 | 12/1984 | Marandet | 310/93 |
| 4,491,755 | 1/1985 | Bertrand | 310/93 |
| 5,044,227 | 9/1991 | Rugraff | 310/105 X |

FOREIGN PATENT DOCUMENTS

| | | |
|---|---|---|
| 1138752 | 6/1957 | European Pat. Off. . |
| 1386434 | 12/1964 | European Pat. Off. . |
| 0404048 | 12/1990 | European Pat. Off. . |
| 1455080 | 9/1996 | European Pat. Off. . |
| 74-32964 | 10/1973 | France . |
| 0030450 | 2/1989 | Japan . |

OTHER PUBLICATIONS

French Search Report, dated Nov. 7, 1996, French Appl. No. FR9601690.

Primary Examiner—Richard M. Lorence
Assistant Examiner—William C. Joyce
Attorney, Agent, or Firm—Marshall, O'Toole, Gerstein, Murray & Borun

[57] ABSTRACT

A vehicle transmission system comprises a shaft and an electrical eddy current retarder itself comprising an annular inductor stator and a rotor. The rotor is connected to the shaft via independent fixing arms extending inwards to the free ends of axial metal tongues secured to the shaft and elastically deformable in a radial direction under the effect of the rotor being subjected to thermal expansion.

8 Claims, 6 Drawing Sheets

VEHICLE TRANSMISSION SYSTEM FITTED WITH AN ELECTRICAL RETARDER

FIELD OF THE INVENTION

The invention relates to transmission systems for self-propelled land vehicles, i.e. to systems enabling the rotary motion of the engine to be transmitted to the wheels of a vehicle.

Of such transmission systems, the invention relates more particularly to those which comprise a shaft rotatable about an axis together with an electrical eddy current retarder itself comprising an annular inductor stator and a rotor, said rotor including at least one wheel secured to the shaft, which wheel includes a ring-shaped core that heats and is subjected to thermal expansion during operation of the retarder, and that itself includes an annular core disk of ferromagnetic material, said core disk being disposed facing the stator and being secured to a plurality of blades forming cooling fins, the wheel further including at least three fixing arms each extending inwards from an outer end secured to the core ring to an inner end connected to the shaft, each fixing arm being free from any mechanical link between its inner and outer ends.

BACKGROUND OF THE INVENTION

Document FR-A-1 138 752 describes an example of such a transmission system.

In the system described in that document, the radial deformation of the core disk under the effect of the high temperatures reached by said core disk while the retarder is in operation is accommodated solely by deformation of the arms for fixing the wheels of the rotor, with the inside ends of said fixing arms being rigidly united by an undeformable hub.

Consequently, the fixing arms are either complex in shape and therefore difficult to make, thus increasing the cost of the electrical retarder, or else simple in shape and poor at accommodating radial deformation, thereby increasing the mechanical stresses in the rotor and thus reducing its lifetime.

OBJECTS AND SUMMARY OF THE INVENTION

A particular object of the present invention is to mitigate those drawbacks.

To this end, according to the invention, in a vehicle transmission system of the kind in question, the inner end of each fixing arm is connected to the shaft by means of a metal tongue which is flat in the radial direction and which extends longitudinally parallel to the axis of rotation at least between a fixing zone secured to the shaft and a free end fixed to the inner end of the fixing arm in question, the various metal tongues being elastically deformable in the radial direction when the core ring is subjected to thermal expansion.

By means of these dispositions, the fixing arms of the rotor wheels can be designed so as to be undeformable or only moderately deformable, since thermal expansion of the rotor wheels is absorbed, at least in part, by elastic deformation of the resilient tongues.

Thus, the fixing arms for the wheels of the rotor can be simpler in shape, therefore easier to make, and thus cheaper than in the prior art.

In preferred embodiments, use is also made of one or more of the following dispositions:

- each fixing arm has a certain width parallel to the axis of rotation, and includes a narrowing where said width is reduced;
- the transmission further includes a metal tube extending longitudinally parallel to the axis of rotation between two ends and secured to the shaft, the metal tongues being cut out axially in at least one of the ends of said tube, and each metal tongue having an axial end secured to said tube: this disposition makes it easy to mount the metal tongues on the rotary shaft;
- the transmission system includes a transmission mechanism driven by the engine of the vehicle, and presenting a case from which the stator of the electrical retarder is cantilevered out, the transmission system also including the above-mentioned shaft and said shaft being connected to a universal joint disposed inside the tube, the rotor including two wheels axially on either side of the stator, the metal tongues on which said wheels are mounted being cut out from the two ends of the tube, one of the ends of said tube having fixing zones which are disposed angularly between the metal tongues and which are fixed to a flange secured to the shaft;
- the transmission mechanism is a gear box;
- the fixing arms of each wheel of the rotor extend in a common radial plane;
- each fixing arm extends in a direction that is substantially radial; and
- each fixing arm is curved, so as to present a certain amount of elastic deformability in the radial direction.

BRIEF DESCRIPTION OF THE DRAWINGS

Other characteristics and advantages of the invention appear from the following detailed description of two embodiments, given as non-limiting examples with reference to the accompanying drawings.

In the drawings.

MORE DETAILED DESCRIPTION

In the various figures, the same references are used to designate elements that are identical or similar.

Figure 1:
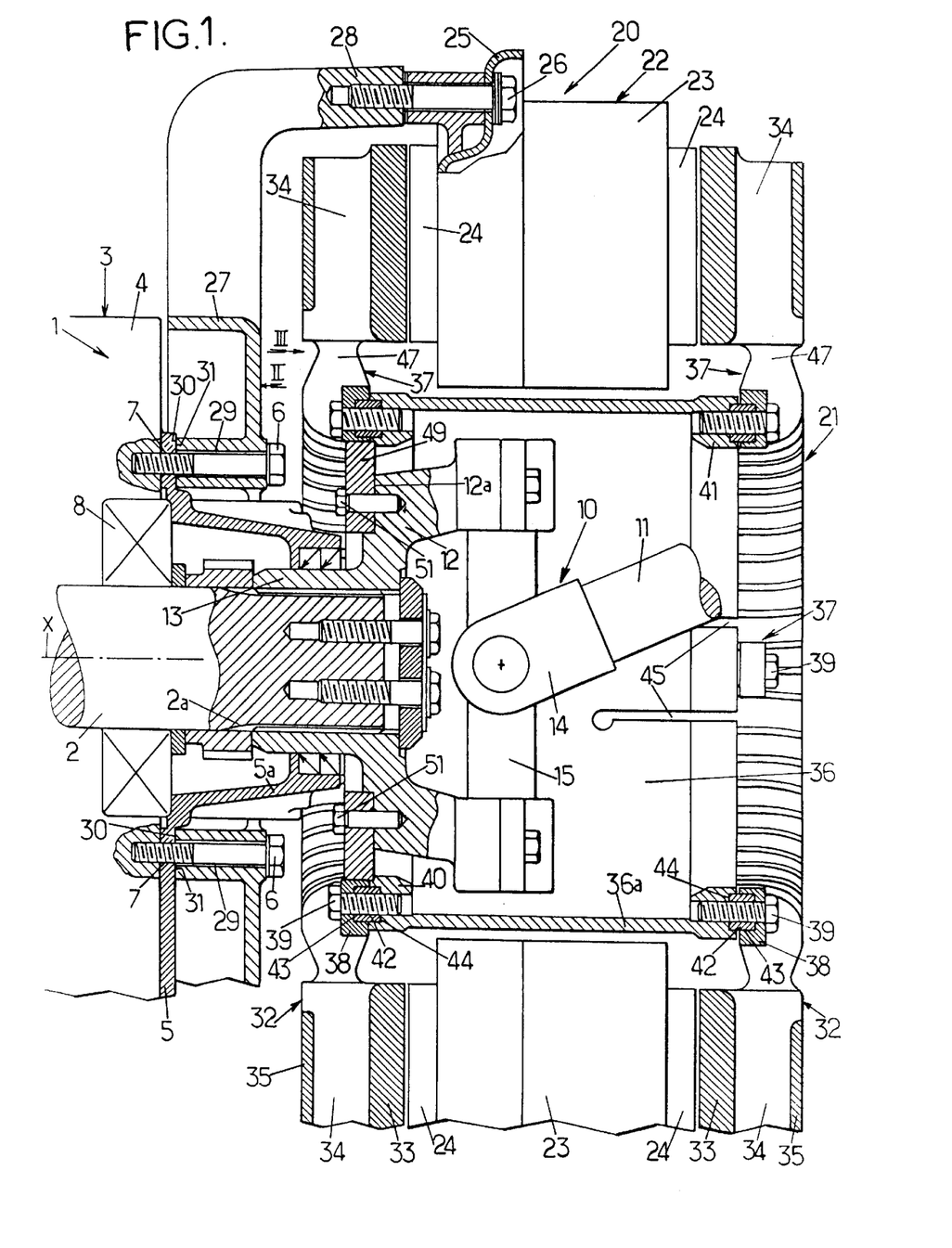
FIG. 1 is a fragmentary diagrammatic vertical section view of a vehicle transmission system constituting a first embodiment of the invention, the section plane being locally offset in the vicinity of two fixing screws for the transmission mechanism closure plate and in the vicinity of a fixing screw for the stator of the electrical retarder.

FIG. 1 shows a portion of a transmission system constituting a first embodiment of the invention and designed for being fitted to a motor vehicle, in particular for a truck or a bus.

This transmission comprises:

- a gear box 1 driven by the vehicle engine (not shown) and having an outlet shaft 2 that rotates about a substantially horizontal axis X;
- a universal joint 10 in a standard axial position, and independent of the presence or otherwise of an electrical retarder, said universal joint being driven by the outlet shaft 2 and itself driving a link shaft 11 which extends generally towards a second universal joint (not shown) connected to a back axle (not shown), one of the forks of the universal joint 10 (the fork 12) being provided with a sleeve 13 having internal fluting and engaged on the end of the outlet shaft 2, which end is provided with external fluting 2a corresponding with the internal fluting of the sleeve 13; and
- an electrical eddy-current retarder 20 mounted in a cantilevered-out position on the gear box 1, with this type of retarder being known under the registered trademark "FOCAL".

The various elements above are described in detail below.

With reference initially to the gear box 1, it is defined externally by a case 3 comprising both a main body 4 and a front closure plate 5.

The closure plate 5 does not have the support portion specially designed for mounting the electrical retarder, and more generally, it is designed independently of the presence or otherwise of an electrical retarder.

The closure plate 5 is fixed in sealed manner on the main body 4 of the case by means of screws 6 passing through holes 7 in said closure plate and screwed into the main body 4.

The closure plate 5 lies in a general plane that is perpendicular to the axis X and it has an annular central projection 5a projecting outwards. The central projection 5a is pierced by the outlet shaft 2, and it also receives the sleeve 13 of the fork 12.

Also, in the vicinity of said central projection 5a, the outlet shaft 2 is supported by an end bearing constituted by a ball bearing 8 which is standard and which is dimensioned independently of the presence or otherwise of the electrical retarder 20.

In conventional manner, the electrical retarder 20 comprises a rotor 21 that rotates with the shaft 2 and an inductor 22 that is stationary and includes electromagnetic coils 23 which, when carrying an electrical current, generate eddy currents in the rotor 21, thereby causing said rotor to exert braking torque on the shaft 2.

There is an even number of stator coils 23, with each coil having its own respective ferromagnetic core (not shown) extending longitudinally parallel to the axis X between two poles 24. The set of poles 24 forms two rings centered on the axis X, the poles 24 in each of the ring being alternately north and south.

The coils 23 and their respective cores are carried by a rigid end plate 25 of non-magnetic material that is substantially annular in shape and that is itself fixed by screws 26 to four arms 28 of a framework 27.

Figures 2, 3, 3A:
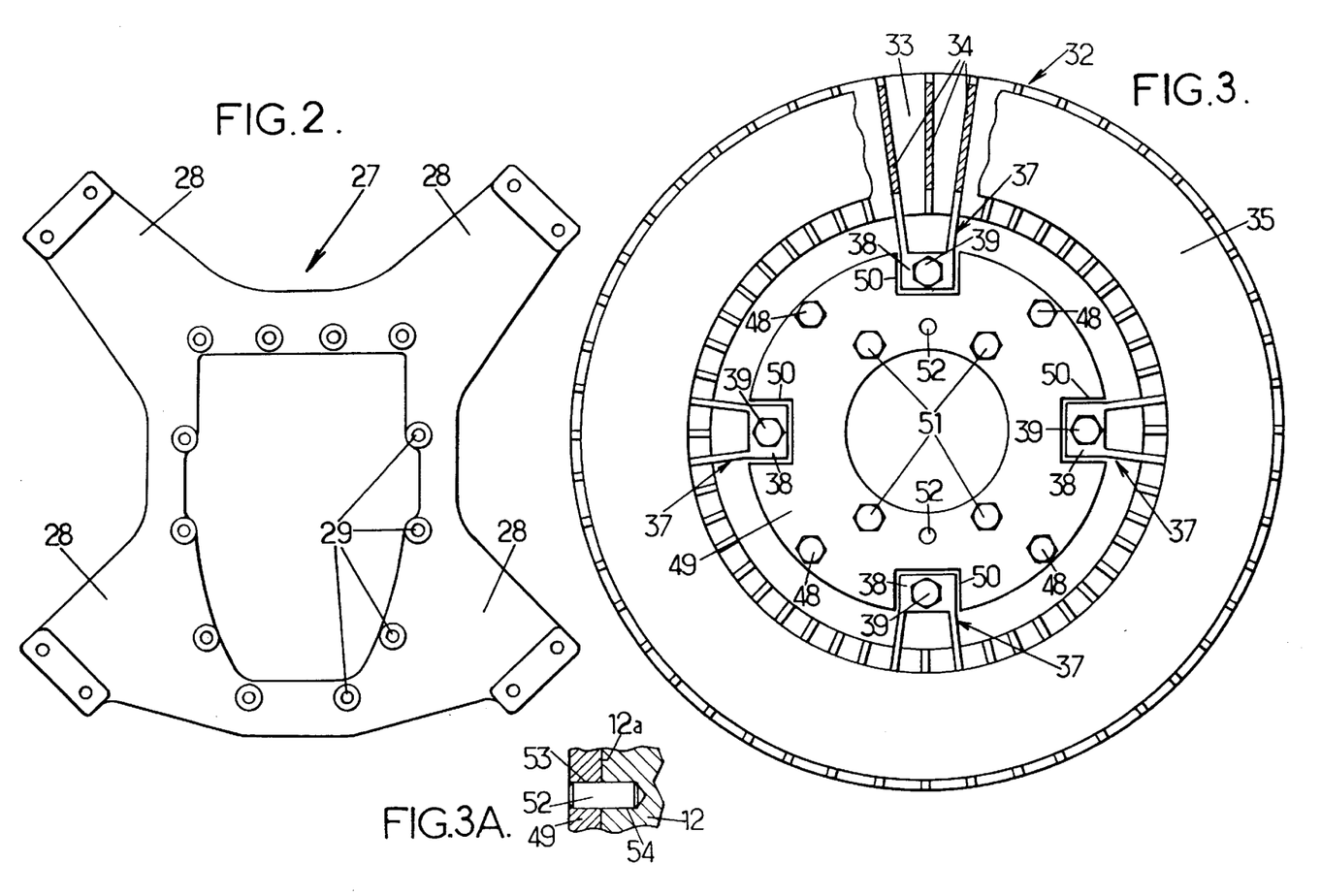
FIG. 2 is a diagrammatic view seen along direction II of FIG. 1, showing the framework which supports the stator of the electrical retarder.
FIG. 3 is a view seen along direction III of FIG. 1, showing the rotor of the electrical retarder.
FIG. 3A is a view showing a detail of FIG. 3 in section.

The framework 27 which is clearly visible in FIGS. 1 and 2 is constituted by a rigid part that can be made, for example, as a GS type casting, and that has holes 29 in register with the holes 7 of the closure plate.

The above-mentioned screws 6 pass through these holes 29, with the heads of the screws pressing against the outside face of the framework 27, thereby simultaneously securing said framework and the closure plate 5 to the main body 4 of the case, such that the closure plate 5 is clamped between the framework 27 and the main body 4.

In order to enable such clamping to be performed under good conditions, it may possibly be necessary to interpose pieces of shim between the fixing plate 5 and the framework 27 in the vicinity of the screws 6.

However, it is preferable to machine the annular bearing surfaces 30 so that they are accurately plane and accurately perpendicular to the axis X on the outside face of the closure plate 5 around each of the holes 7, and for the framework 27 similarly to include machined bearing surfaces 31 that are accurately plane and accurately perpendicular to the axis X. The bearing surfaces 30 and 31 are disposed in register and they are in mutual contact, thereby enabling the framework 27 to bear properly against the closure plate 5.

The rotor 21, which is clearly visible in FIGS. 1 and 3, also includes two wheels 32 each of which lies in a radial plane, and both of which are made of ferromagnetic material, generally of steel.

Each of the wheels 32 comprises a relatively thick annular disk 33 disposed facing one of the rings of poles 24 of the stator, with a narrow gap (e.g. 1 mm to 3 mm) being left between said disk 33 and the corresponding poles 24.

Each disk 33 is secured to a ring of blades 34 forming cooling fins and all extending in the radial plane of the corresponding wheel 32.

In addition, in the example shown in the drawings, each set of blades extends in a radial direction, but optionally each of them could extend in a direction that is inclined relative to the radial direction, while still remaining in the radial plane of the corresponding wheel 32.

On the face of each wheel 32 that is further from the stator, the sets of blades 34 are also spaced apart by a relatively thin disk 35.

This disk 35 thus co-operates with the thick disk 33 to define an annular space in which the blades 34 are disposed and in which cooling air for the wheels 32 is channeled.

Also, each wheel 32 of the rotor is mounted at one of the axial ends of an intermediate tube 36 of steel that is generally in the form of a circular cylinder about the axis X.

In order to make this assembly, each wheel 32 of the rotor includes four fixing arms 37 disposed at 90° to one another and each constituted by two blades 34 extended inwardly to a fixing plate 38, itself fixed to the intermediate tube 36 by a screw 39 parallel to the axis X.

In the example shown in FIG. 3, the two blades 34 together forming each fixing arm 37 are themselves separated by an intervening blade 34 that is not extended radially inwards, but this particular disposition is not limiting.

The fixing arms 37 extend in the radial plane of the corresponding wheel 32 without extending diagonally axially towards the midplane of the retarder, as used to be the case in prior art electrical retarders: this makes the wheels 32 easier to make, particularly when the wheels are made by molding.

Figures 4, 6:
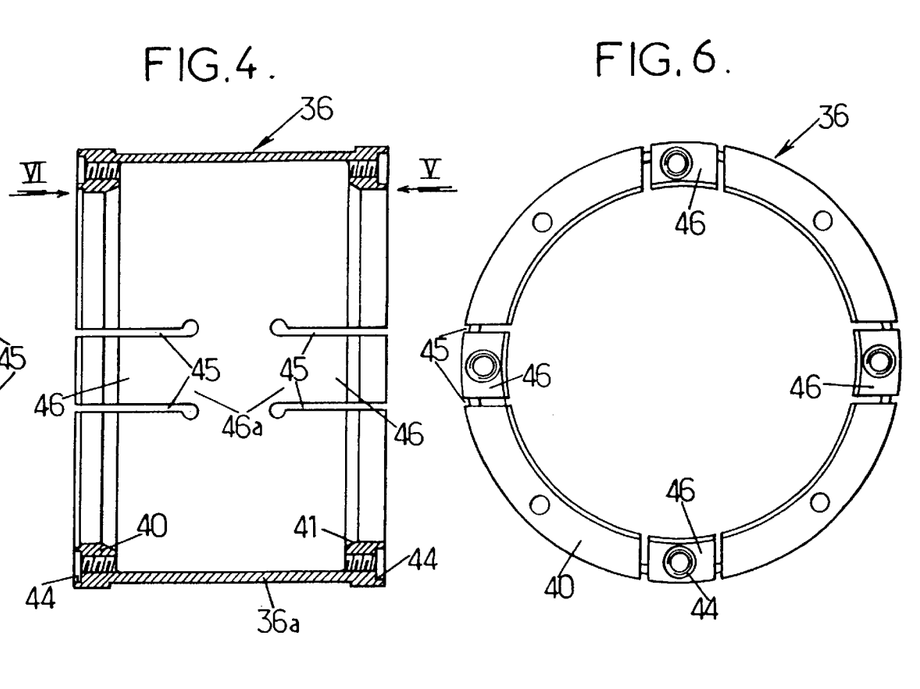
FIG. 4 is a view in axial section showing a detail of an intermediate tube belonging to the rotor of the electrical retarder in the transmission system shown in FIG. 1.
FIGS. 5 and 6 are end views of the FIG. 4 tube, as seen respectively in directions V and VI of FIG. 4.
Figure 5:
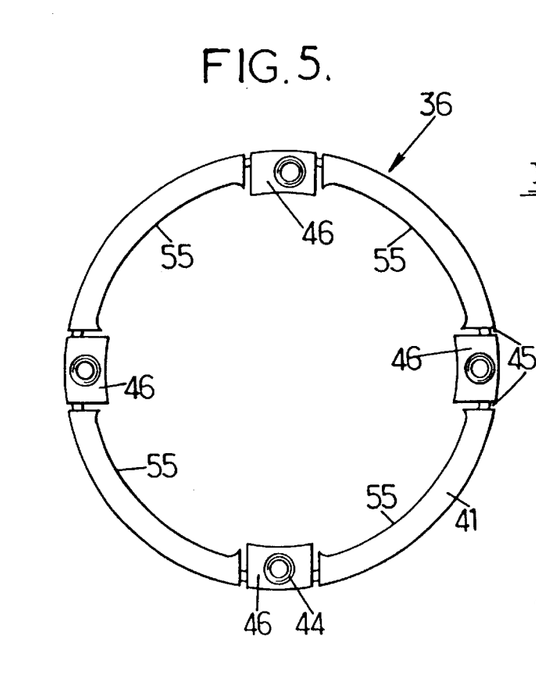

Also, the intermediate tube 36 which is shown in detail in FIGS. 4 to 6 has first and second substantially annular flanges 40 and 41 at its respective ends, with the screws 39 for securing the wheels 32 being screwed thereto.

In order to minimize angular clearance for mounting the wheels 32 on the flanges, the screws 39 pass through steel rings 42 each of which is a force-fit both in a bore 43 belonging to the corresponding plate 38, and in a bore 44 belonging to the corresponding flange 40, 41.

In addition, the intermediate tube 36 preferably includes slots 45 extending axially towards the inside of the tube from one or the other of the two ends of the tube, with each slot 45 extending over less than half the axial length of the tube, e.g. over about ⅓ the length of the tube.

The slots 45 are disposed in pairs on either side of each screw 39, thereby defining axial tongues 46 at both ends of the tube 36 with the arms 37 of the wheels 32 being fixed to the ends of said blades. Each tongue 46 is secured through its inner end 46a to the shaft 2, said inner end 46a thereby constituting a fixing zone of said tongue.

These metal tongues 46 are strong enough to avoid being significantly deformed under the effect of the external constraints to which the wheels 32 are subjected, and in particular:

the weights of the wheels 32 (e.g. about 30 kg per wheel);

the vertical dynamic constraints due to the running of the vehicle, which can give rise for example to accelerations of as much as 2 g to 3 g, depending on the circumstances of use;

the braking torque obtained in operation of the electrical retarder, said torque possibly taking a value of about 2,000 Nm to 2,500 Nm, for example; and the magnetic attraction force to which the wheels 32 are subjected towards the poles 24, said force possibly exceeding one (metric) ton, for example, depending on the size of the air gap.

In contrast, the metal tongues 46 are dimensioned so as to be capable of deforming elastically radially towards the outside when the wheels 32 of the rotor are subjected to thermal expansion due to the high temperatures to which they can be raised in operation of the retarder, thereby compensating for lack of radial deformability in the fixing arms 37.

Where appropriate, the fixing arms 37 may also be designed to be capable of radial deformation. Such deformability may be obtained, for example, by giving sufficient curvature to the extensions of the blades 34 constituting the fixing arms 37, which fixing arms preferably remain situated in the same radial plane as the corresponding wheels 32.

In addition, each of the blades 34 which extend radially inwards to form a fixing arm 37 preferably presents a narrowing 47 in the X direction between the disk 33 and the corresponding plate 38.

This narrowing 47 serves to reduce the stiffness of the arms 37 in bending, thereby limiting the stresses due to thermal deformation of the parts.

Finally, the first flange 40 of the intermediate tube 36 is fixed to a steel slab 49 by means of four screws 48 that are angularly offset by 45° relative to the screws 39.

The slab 49 is situated substantially in the same radial plane as the plates 38 for fixing the wheels 32, and it has external notches 50 through which said plates 38 pass.

The slab 49 is fixed by means of screws 51 to the rear face 12a of the fork 12 of the universal joint, in an annular space left free between the fork 12 and the closure plate 5.

The rear face 12a is formed by an outer shoulder presented by the fork 12, and said rear face is preferably machined so as to be accurately plane and perpendicular to the axis X.

In order to guarantee assembly without angular clearance of the slab 49 relative to the fork 12, the screws 51 are advantageously associated with metal pegs 52 constituting force-fits both in respective bores 53 passing axially through the slab 49 and in respective blind bores 54 penetrating into the fork 12 from its rear face 12a (see FIG. 3A).

It will be observed that the above-described intermediate tube 36 is effective in limiting the diametrical extent of the electromagnetic retarder.

The central portion 36a of the intermediate tube, lying axially between the two flanges 40 and 41 can be situated radially very close to the coils 23 since the fixing arms 37 of the two wheels 32 are not united in the center of the rings of coils 23, unlike prior art devices.

Also, because the central portion 36a of the intermediate tube needs to support only one wheel 32 and not two wheels, this central portion can be relatively thin and, for example, its thickness may be about 6 mm.

Also, the flanges 40 and 41 of the intermediate tube 36 extend radially inwards relative to the central portion 36a of the tube, such that the intermediate tube has substantially no portions projecting radially outwards, thus making it possible both to insert the intermediate tube 36 easily into the ring of coils 23 in spite of the small amount of radial clearance that exists between the set of coils and the ring, and also to limit the radial extent of the intermediate tube.

The fact that the flanges 40 and 41 are disposed on the inside of the intermediate tube does not hinder in any way the operation of the universal joint 10 insofar as the flange 40 is secured to the fork 12 of said joint while the flange 41 is situated axially beyond the other fork 13 going away from the gear box, i.e. in register with the shaft 11, taking up much less space than the universal joint 10.

Finally, to further restrict the radial clearance required between the universal joint 10 and the central portion 36a of the intermediate tube, the second flange 41 of said intermediate tube has scalloping 55 on the inside in its portions extending between the deformable tongues 46.

A large universal joint can thus be mounted inside the intermediate tube 36 by passing the branches of the crossmember 15 of the universal joint and the two forks 12 and 14 thereof via the scalloping 55.

The above-described device can be made completely in the factory on initial assembly of the transmission system, however it can also be made by retrofitting the electrical retarder to a transmission system that is already mounted on a vehicle.

Under such circumstances, it is preferable to proceed as follows:

after disassembling the universal joint 10, at least some of the fixing screws 6 for the closure plate 5 are removed;

the bearing surfaces 30 are machined on the outside face of the closure plate 5;

the initial screws 6 are replaced by longer fixing screws 6, and the framework 27 is fixed to the case by means of these new screws, while simultaneously clamping the closure plate 5 between the framework 27 and the main body 4 of the case;

the rear face 12a of the fork 12 is machined so as to give it a surface that is accurately plane and perpendicular to the axis X;

three tapped holes are formed in the fork 12, starting from its rear face;

the fork 12 is engaged inside the intermediate tube 36 that has previously been fixed to the slab 49, and the fork 12 is fixed to the slab 49 by means of screws 53;

bores 53 and 54 are pierced simultaneously through the slab 49 and in the fork 12, after which metal pegs 52 are force-fitted in said bores, the fork 12 is reassembled onto the outlet shaft 2 from the gear box, and simultaneously the end plate 25 of the stator is fitted to the framework 27 by means of screws 26; and the universal joint 10 and the shaft 11 are fully reassembled.

Figure 7:
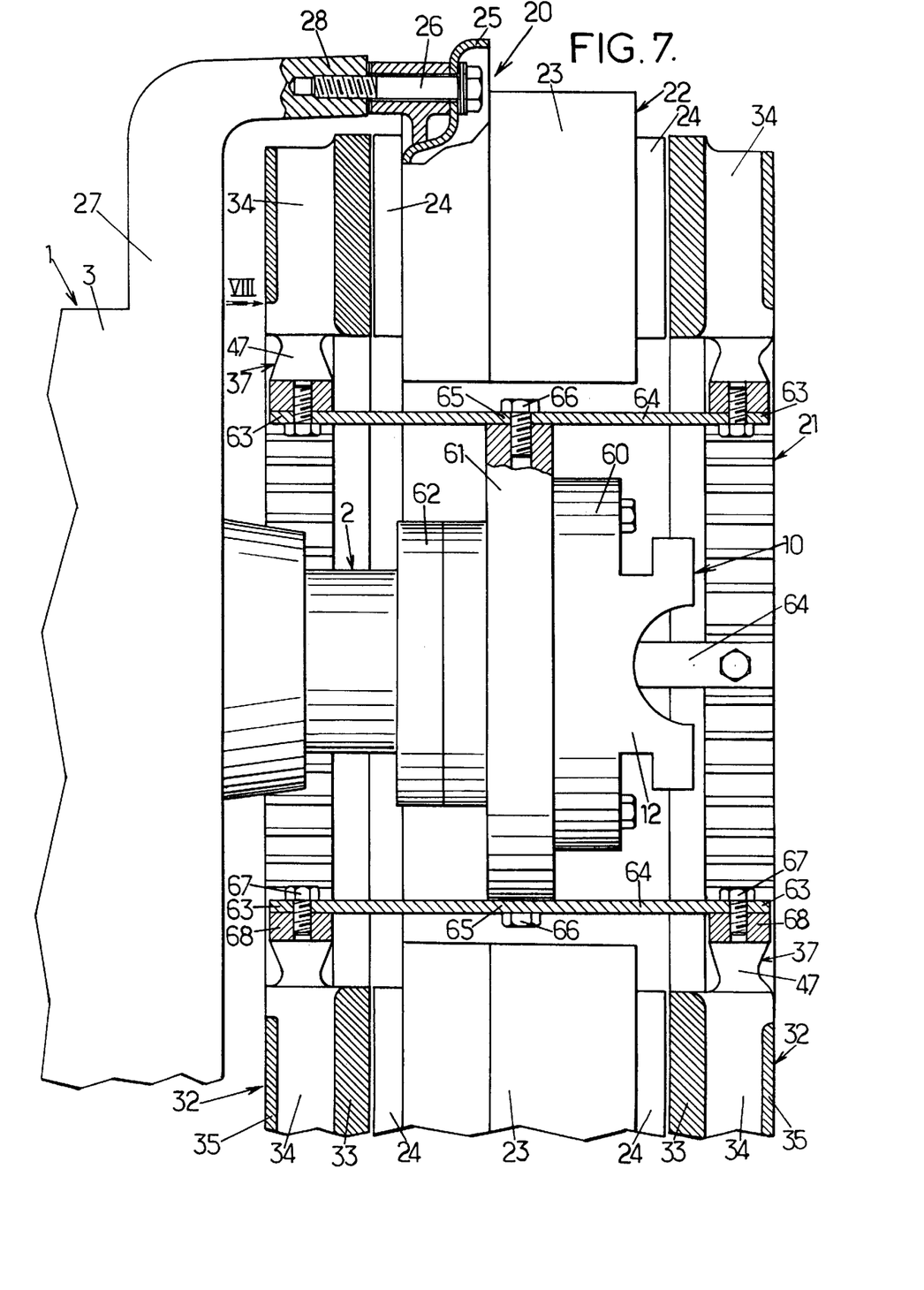
FIG. 7 is a fragmentary diagrammatic view in vertical section of a vehicle transmission system constituting a second embodiment of the invention, the section plane being locally offset in the vicinity of a screw for fixing the stator of the electrical retarder.
Figure 8:
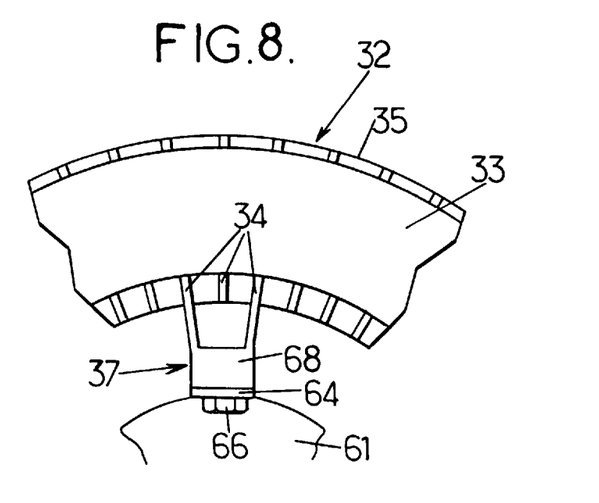
FIG. 8 is a view in direction VIII of FIG. 7, showing the rotor of the electrical retarder.

FIGS. 7 and 8 show a second embodiment of the invention which, like the first embodiment of the invention, comprises a gear box 1 from which an electrical retarder 20 is cantilevered out, the outlet shaft 2 of the gear box driving, as before, a universal joint 10 of which only the rear fork 12 is shown.

Its various elements are similar to those described above with reference to FIGS. 1 to 6, so they are not described again in detail herein.

The embodiment of FIGS. 7 and 8 differs from the embodiment of FIGS. 1 to 6 in the following respects:

the fork 12 of the universal joint 10 is not directly engaged on a fluted length of shaft from the gear box 1, but it has a flange 60 which is fixed to a radial intermediate slab 61, itself fixed to an outlet flange 62 secured to the outlet shaft 2 of the gear box; and the four fixing arms 37 for the wheels 32 are not fixed to an intermediate tube, but to the free ends 63 of four independent steel tongues 64 that are flat in the radial direction.

Each of the four tongues 64 has a central portion 65 which is rigidly fixed to the periphery of the intermediate disk 61 by means of a screw 66, and it extends longitudinally parallel to the axis of rotation X between its two free ends 63.

Each fixing arm 37 can be mounted to the free end 63 of the corresponding tongue 64 by means of a screw 67, for example, passing through the tongue 64 and being screwed into a rigid block 68 secured to the inside end of the fixing arm 37.

As in the embodiment of FIGS. 1 to 6, the steel tongues 64 are strong enough to avoid significant deformation under the effect of the external stresses to which the wheels 32 are subjected.

However, these metal tongues 64 are dimensioned so as to be capable of deforming elastically radially outwards when the wheels 32 of the stator are subjected to thermal expansion because of the high temperatures to which they can be raised when the retarder is in operation.

Under all circumstances, the fixing arms 37 for each wheel 32 extend substantially in a common radial plane.

Figure 9:
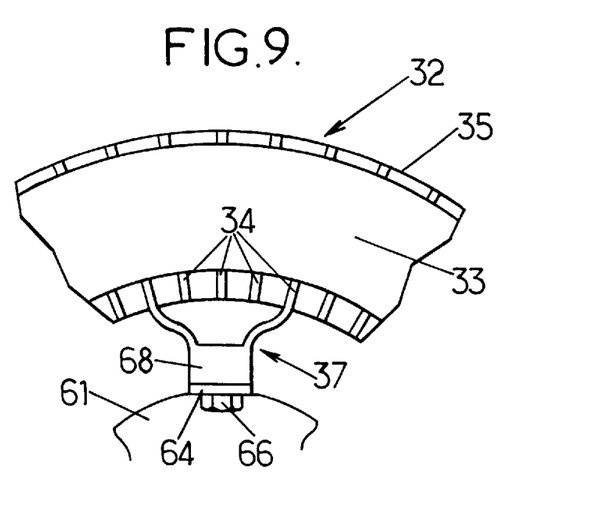
FIG. 9 is a view similar to FIG. 8, for a variant of the system of FIGS. 7 and 8.

Also, the portions of the blades 34 that extend radially inwards to close each fixing arm 37 may each optionally extend radially, thereby greatly simplifying the construction of the wheels 32. In this case, the fixing arms 37 have no radial deformability, such that all of the radial deformation of the core disks 33 due to thermal expansion is accommodated by the steel tongues 64.

Where appropriate, as shown in FIG. 9, the portions of two blades 34 that extend radially inwards to form each fixing arm 37 may optionally not be radial and rectilinear, but may on the contrary have sufficient curvature to enable the corresponding fixing arm 37 to deform radially to some extent, while nevertheless remaining in the radial plane of the wheel 32, thus still ensuring that said wheel 32 remains relatively easy to manufacture. In this case, the radial deformation of the core disks 33 is taken up both by the steel tongues 64 and by the fixing arms 37.

Figure 10:
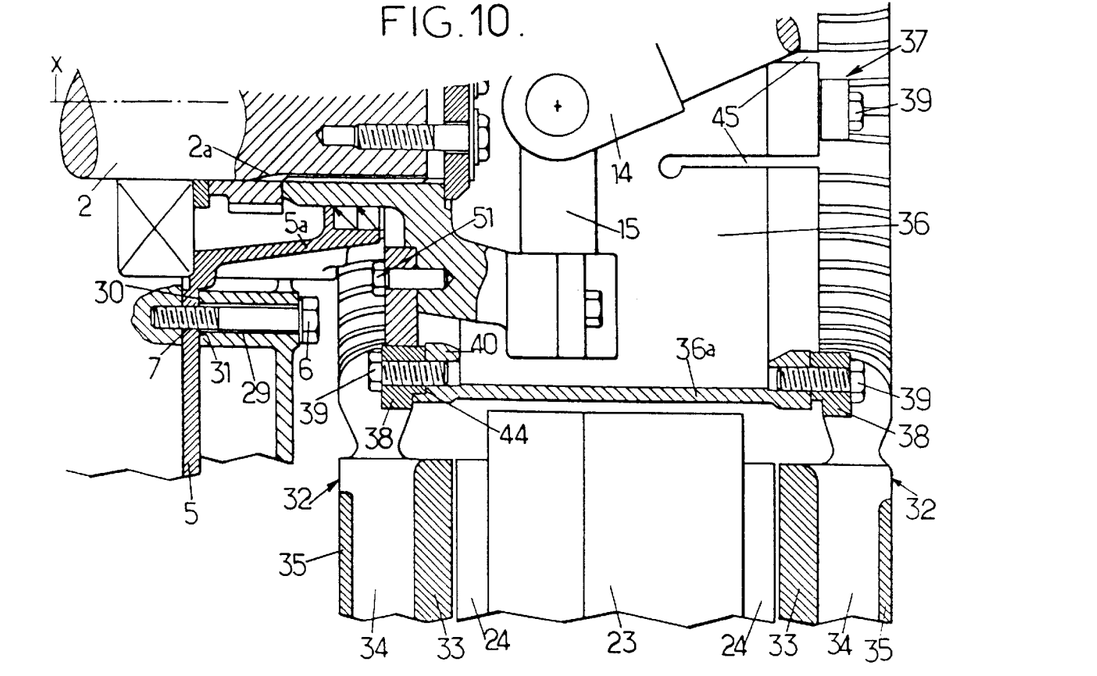
FIGS. 10 and 11 are fragmentary views similar respectively to FIGS. 1 and 3 showing a variant of the system of FIGS. 1 to 6.
Figure 11:
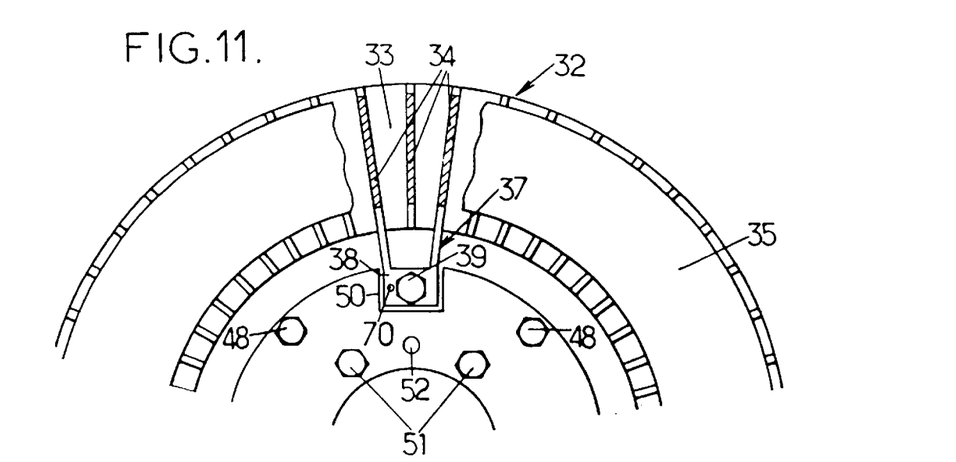

It will be observed, that in the embodiment of FIGS. 1 to 5, the rings 42 serving to assemble the wheels 32 could advantageously be omitted, as shown in FIGS. 10 and 11.

In this case, it is preferable to provide metal pegs 70 disposed adjacent to at least some of the screws 39 and engaged as force-fits both in the corresponding plate 38 and in the corresponding flange 40, 41.

I claim:

1. A transmission system for a self-propelled land vehicle, the transmission system comprising a shaft rotatable about an axis together with an electrical eddy current retarder itself comprising an annular inductor stator and a rotor, said rotor including at least one wheel secured to the shaft, which at least one wheel includes a ring-shaped core that heats and is subjected to thermal expansion during operation of the retarder, and that itself includes an annular core disk of ferromagnetic material, said core disk being disposed facing the stator and being secured to a plurality of blades forming cooling fins, said at least one wheel further including at least three fixing arms each extending inwards from an outer end secured to the ring-shaped core to an inner end connected to the shaft, wherein the inner end of each fixing arm is connected to the shaft by means of a metal tongue which is flat in the radial direction and which extends longitudinally parallel to the axis of rotation at least between a metal tongue fixing zone secured to the shaft and a free end fixed to the inner end of the fixing arm in question, each metal tongue being elastically deformable in the radial direction when the core ring is subjected to thermal expansion.

2. A transmission system according to claim 1, in which each fixing arm has a certain width parallel to the axis of rotation, and includes a narrowing where said width is reduced.

3. A transmission system according to claim 1, further including a metal tube extending longitudinally parallel to the axis of rotation between two ends and secured to the shaft, each metal tongue being cut out axially in at least one of the ends of said tube, and each metal tongue having an axial end secured to said tube.

4. A transmission system according to claim 3, further including a transmission mechanism driven by the engine of the vehicle, and including a case from which the stator of the electrical retarder is cantilevered out, the transmission system also including the above-mentioned shaft and said shaft being connected to a universal joint disposed inside the tube, said at least one wheel comprising two wheels axially on either side of the stator, the metal tongues on which said wheels are mounted being cut out from the two ends of the tube, one of the ends of said tube having tube fixing portions which are disposed angularly between the metal tongues and which are fixed to a flange secured to the shaft.

5. A transmission system according to claim 4, in which the transmission mechanism is a gear box.

6. A transmission system according to claim 1, in which the fixing arms of each wheel of the rotor extend in a common radial plane.

7. A transmission system according to claim 6, in which each fixing arm extends in a direction that is substantially radial.

8. A transmission system according to claim 6, in which each fixing arm is curved, so as to present a certain amount of elastic deformability in the radial direction.

* * * * *